United States Patent [19]

Vane

[11] Patent Number: 5,055,242
[45] Date of Patent: Oct. 8, 1991

[54] PROCESS FOR CONTINUOUSLY FORMING REINFORCED ARTICLES

[75] Inventor: Jeffrey A. Vane, Newbury, England

[73] Assignee: Tech Textiles Limited, Andover, England

[21] Appl. No.: 411,382

[22] Filed: Sep. 25, 1989

[30] Foreign Application Priority Data

Sep. 26, 1988 [GB] United Kingdom ............... 8822520

[51] Int. Cl.⁵ ...................... B29C 63/06; B29C 63/24
[52] U.S. Cl. ................................... 264/22; 264/103; 264/135; 264/137; 264/258; 264/313; 264/324; 264/172; 264/173; 156/148; 156/173; 156/187
[58] Field of Search ............... 156/148, 245, 173, 169, 156/174, 177, 178, 179, 180, 181, 182, 183, 184, 185, 186, 187, 188; 428/300, 301; 264/136, 137, 258, 135, 134, 103, 294, 325, 319, 313, 324, 22, 172, 173

[56] References Cited

U.S. PATENT DOCUMENTS

| | | | |
|---|---|---|---|
| 3,506,530 | 4/1970 | Crosby | 156/148 |
| 3,713,931 | 1/1973 | Lerche-Svendsen | 428/301 |
| 3,756,893 | 9/1973 | Smith | 156/148 |
| 3,919,028 | 11/1975 | Lewis et al. | 156/148 |
| 4,042,655 | 8/1977 | Platt et al. | 428/301 |
| 4,478,771 | 10/1984 | Schreiber | 264/137 |
| 4,595,438 | 6/1986 | Kent et al. | 156/148 |
| 4,752,513 | 6/1988 | Rau et al. | 428/300 |
| 4,911,973 | 3/1990 | Dunbar | 264/258 |

FOREIGN PATENT DOCUMENTS

49-8428  2/1974  Japan ................. 428/300

Primary Examiner—Jay H. Woo
Assistant Examiner—Jeremiah F. Durkin, II
Attorney, Agent, or Firm—Finnegan, Henderson, Farabow, Garrett & Dunner

[57] ABSTRACT

A process for continuously forming reinforced articles (24) which includes producing a reinforcing material (13) having a plurality of superimposed layers (1-6), stitching together said layers (1-6), wetting said reinforcing material (13) with a matrix material (7, 8 or 19), forming the wetted reinforcing material and curing or consolidating the matrix material. Each layer (1-6) of the reinforcing material (13) includes a plurality of unidirectional non-woven yarns or threads (10) laid side-by-side, the yarns or threads (10) in at least some of the different layers (1-6) extending in different directions. Forming of the wetted reinforcing material may be effected by moulding, pultrusion or by wrapping wetted reinforcing material around a mandrel or former (25).

30 Claims, 2 Drawing Sheets

PROCESS FOR CONTINUOUSLY FORMING REINFORCED ARTICLES

FIELD OF THE INVENTION

The present invention relates to a process for continuously forming reinforced articles.

BACKGROUND OF THE INVENTION

A known method of forming reinforced plastics articles is to lay a mat of non-woven or woven glass fibre or other reinforcement in a mould, to wet the mat of reinforcing material with a synthetic resin material, to cure the resin and to remove the moulded article from the mould. When a greater thickness of reinforced plastics material is required in the moulded article then further mats of reinforcing material are laid over the first, wetted and cured. This known method is not continuous, is slow, labour intensive and unsuitable for automation. Moreover, with mats of non-woven fibres the distribution of the fibres is random so that the strength characteristics of the reinforcement in any particular direction are unpredictable. With woven reinforcing materials the warp and weft are crimped where they intersect which reduces the strength thereof and makes it impossible to form the reinforcing material to complex shapes without creasing or buckling.

It is also known to mould reinforced plastics articles by mixing chopped reinforcing fibres in a synthetic resin material and moulding the resulting mixture in a closed mould. This method suffers from the disadvantage that the chopped reinforcing fibres are randomly distributed and randomly oriented in the finished article with the result that the article may contain resin-rich and reinforcing fibre-rich areas whereby the quality and mechanical properties of the article can be unpredictable.

Another known method of forming reinforced plastics articles is by pultrusion, wherein yarns or threads of reinforcing material are fed either alone or together with strips of woven or non-woven reinforcing material through a pultrusion die, the reinforcing material is wetted with a synthetic plastics material as it passes through the die and the synthetic plastics material is cured as the formed article emerges from the die. This method enables articles of complex cross-sectional shape to be produced but suffers from the disadvantage that the yarns or threads can become bunched together as they pass through the pultrusion die making it difficult to produce articles of consistent quality and strength.

A further known method of producing reinforced plastics articles, such as pipes and tubes, is by filament winding wherein reinforcing yarns or threads are wetted with synthetic resin material and are wound on a former to produce the article. The reinforcing yarns or threads are wound on the rotating former by traversing means which can be controlled to lay the reinforcing yarns or threads on the former at a required angle relative to the longitudinal axis of the former to provide required hoop strength in the finished article. It is not, however, possible to provide reinforcing yarns or threads extending longitudinally of the article to provide longitudinal strength. Accordingly, where longitudinal strength is required it is usual to supplement the wound yarns or threads with one or more layers of woven or non-woven reinforcing material wrapped around the former. Not only is this method slow but it is also difficult by this method to produce articles having satisfactory longitudinal strength.

SUMMARY OF THE INVENTION

The present invention has as its object to provide a process for forming reinforced plastics articles which is continuous, which enables a wide variety of articles of consistent quality and strength to be produced and which overcomes many of the problems of the known methods.

The present invention provides a process for continuously forming reinforced articles, the process comprising the steps of:

(a) producing a reinforcing material having a plurality of superimposed layers, each layer consisting of a plurality of unidirectional non-woven yarns or threads laid side-by-side, the yarns or threads in at least some of the different layers extending in different directions.

(b) stitching together said layers, (c) wetting said reinforcing material with a matrix material, (d) forming the wetted reinforcing material, and (e) curing or consolidating the matrix material.

The reinforcing material may be produced by drawing yarns or threads from a creel or loom, laying said yarns or threads side-by-side so that they are unidirectional and extend in a first direction to form a first said layer, drawing yarns or threads from a second creel or loom, laying the yarns or threads from the second creel or loom side-by-side on said first layer so that the yarns or threads are unidirectional, extend in a second direction and form a second layer superimposed upon the first layer, and so on until the required number of layers has been built-up. Preferably, the yarns or threads in at least two of said layers are laid so that they extend at 90° to one another. Advantageously, the yarns or threads in at least one further layer are laid so that they extend at an angle of from 45° to 90° with respect to the yarns or threads in at least one of said at least two layers. Thus, for example, said layers may comprise at least a layer in which the yarns or threads extend in a first direction, a layer in which the yarns or threads extend in a second direction at 90° to the first direction, a layer in which the yarns or threads extend in a third direction at 45° to the first direction, and a layer in which the yarns or threads extend in a fourth direction at 45° to the first direction, and 90° to the third direction. Such a reinforcing material may be isotropic. If desired, the yarns or threads in at least one of said layers may be laid at different densities in different parts of the layer to provide different strength characteristics in different parts of the reinforcing material. This enables the reinforcing material to be "engineered" to suit different applications.

The yarns or threads used to produce the reinforcing material may be yarns, threads, rovings, tows or the like, of continuous or discontinuous fibres, of glass fibre or other suitable reinforcing material such as carbon fibre, aramid fibre, ceramic fibres, metal, polyethelene fibres, polyester fibres or the like.

The layers of the reinforcing material may be stitched together by knitting through the superimposed layers of reinforcing material so as to hold the yarns or threads in the different layers in fixed position relative to one another. The yarn or thread used for stitching together said layers may itself be a reinforcing material or a thermoplastic or other material.

The matrix material used to wet the reinforcing material may be a metal or ceramics material but is preferably a thermosetting, thermoplastic or other suitable synthetic resin material and may be any of the synthetic resin materials normally used for forming reinforced plastics articles, such as epoxy resins, phenolic resins, vinyl esters and the like.

The reinforcing material may be wetted with the matrix material in any suitable manner, as by passing the reinforcing material through a bath of the matrix material, by spraying the reinforcing material with the matrix material, by injecting matrix material into the reinforcing material or by passing the reinforcing material through a curtain of matrix material. Where the matrix material is a thermoplastics material it will need to be heated before the reinforcing material is wetted therewith.

According to an embodiment of the present invention at least one film, sheet, ribbon or tape of thermoplastic material is interposed between at least two of said layers of reinforcing material and/or is applied to one or both outer surfaces of the superimposed layers, preferably before said layers are stitched together. The reinforcing material with the thermoplastic material thereon and/or therein is then heated to soften the thermoplastic material and wet the reinforcing material prior to said forming step. By providing at least one film or sheet of thermoplastic material between each of the adjacent layers of the reinforcing material and, if desired or necessary, on one or both outer surfaces of the reinforcing material, complete wetting of the reinforcing material can be ensured. The wetted reinforcing material may be formed in any suitable manner, as by moulding, pressing, pultrusion or wrapping the wetted reinforcing material around a mandrel or former.

Preferably, an accumulator is provided between means for producing the reinforcing material and means for forming the wetted reinforcing material, the accumulator serving to compensate for any slight discrepancies in the speed of operation of the means for producing the reinforcing material and the forming means and to provide a supply of reinforcing material in the event that there should be a temporary interruption in the operation of the means for producing the reinforcing material. The accumulator may take the form of a frame having a plurality of parallel supports or rollers thereon over which the reinforcing material is looped so that it hangs down in folds from said supporting means or rollers.

Because the reinforcing material used in the process of the present invention is multi-axial and the yarns or threads in each of said layers are held in fixed side-by-side position relative to one another but are capable of slipping longitudinally relative to one another, the reinforcing material can be formed to complex shapes without buckling or creasing.

Where the wetted reinforcing material is formed by moulding, such moulding is preferably carried out in a closed mould and may be effected using both heat and pressure. The reinforcing material may be wetted with the matrix material either before the reinforcing material enters the mould or whilst the reinforcing material is in the mould as by injecting matrix material into the mould. Any suitable means may be provided for separating that part of the reinforcing material which is being or has been moulded from the remainder of the reinforcing material. The separating means may be a cutting blade, hot wire, or any other cutting or severing means well known in the art. The rate of production of the reinforcing material may be coordinated with the cycle time of the mould or mould press, with any slight variations therebetween being accommodated by the said accumulator. Moulding or pressing is suitable for producing articles such as body panels for vehicles, building panels and the like. Because the reinforcing material is multi-axial, and can therefore be isotropic, it is possible to produce by the method of the present invention articles such as, for example, body panels for vehicles which have many properties equal to or superior to steel.

According to another embodiment of the present invention the wetted reinforcing material is formed by passing it through a die, preferably a pultrusion die. In this embodiment the reinforcing material may be wetted as it passes through the pultrusion die. The forming of reinforced plastics articles by pultrusion is well known in the art and is suitable for forming articles which are of the same cross-section throughout their length and which can be of complex cross-sectional shapes. Thus pultrusion is suitable for producing articles such as angle sections, H-sections for use as girders and the like, tubes, box-sections and panels e.g., building panels, of complex cross-sectional shape. The method of the present invention has the advantage over known pultrusion methods that multi-axial reinforcement is provided in a simple manner using a single reinforcing material and that because the yarns or threads in each of the layers of the reinforcing material are maintained in fixed position relative to one another by said stitching there is no fear of bunching of the yarns or threads in any of the layers and that accordingly articles of consistent quality and strength can readily be produced.

According to another embodiment of the invention the wetted reinforcing material is formed by wrapping it around a mandrel or former. This method is particularly suitable for producing articles such as tubes or pipes of round, square or other cross-section which, if desired, can be subsequently slit longitudinally to produce other articles such as channel sections, angle sections and the like. The method is suitable for producing pipes and tubes in a wide variety of sizes ranging from small-bore tubes or conduits to large sewer pipes and the like. For the smaller sizes of pipes or tubes, a plurality of mandrels or formers may be mounted on a conveyor and be moved successively to a winding station where the wetted reinforcing material is wrapped therearound, the matrix material cured or consolidated as the mandrel or former having the wetted reinforcing material wrapped therearound travels to a removal station and the cured or consolidated article removed from the mandrel or former at the removal station. The or each mandrel or former may be collapsible to facilitate the removal of the cured or consolidated article therefrom. The method of the present invention has the advantage over known filament winding methods for producing pipes and tubes that multi-axial reinforcement is provided in a simple and convenient manner and that the rate of production is very much faster than with known filament winding methods.

Formed articles produced by the method of the present invention may be cured or consolidated in any of the ways well known in the art. Thus, where the matrix material is a metal material or thermoplastic resin, the formed article may be consolidated by cooling either naturally by standing in ambient conditions or by means of blowers or other cooling means. Where the matrix material is a thermosetting resin then the formed articles may be cured either during or after the forming thereof, by the application of heat, by ultra-violet light or even chemically.

BRIEF DESCRIPTION OF THE DRAWINGS

The present invention will be more particularly described with reference to the accompanying drawings, in which.

DESCRIPTION OF THE PREFERRED EMBODIMENT

Figure 1:
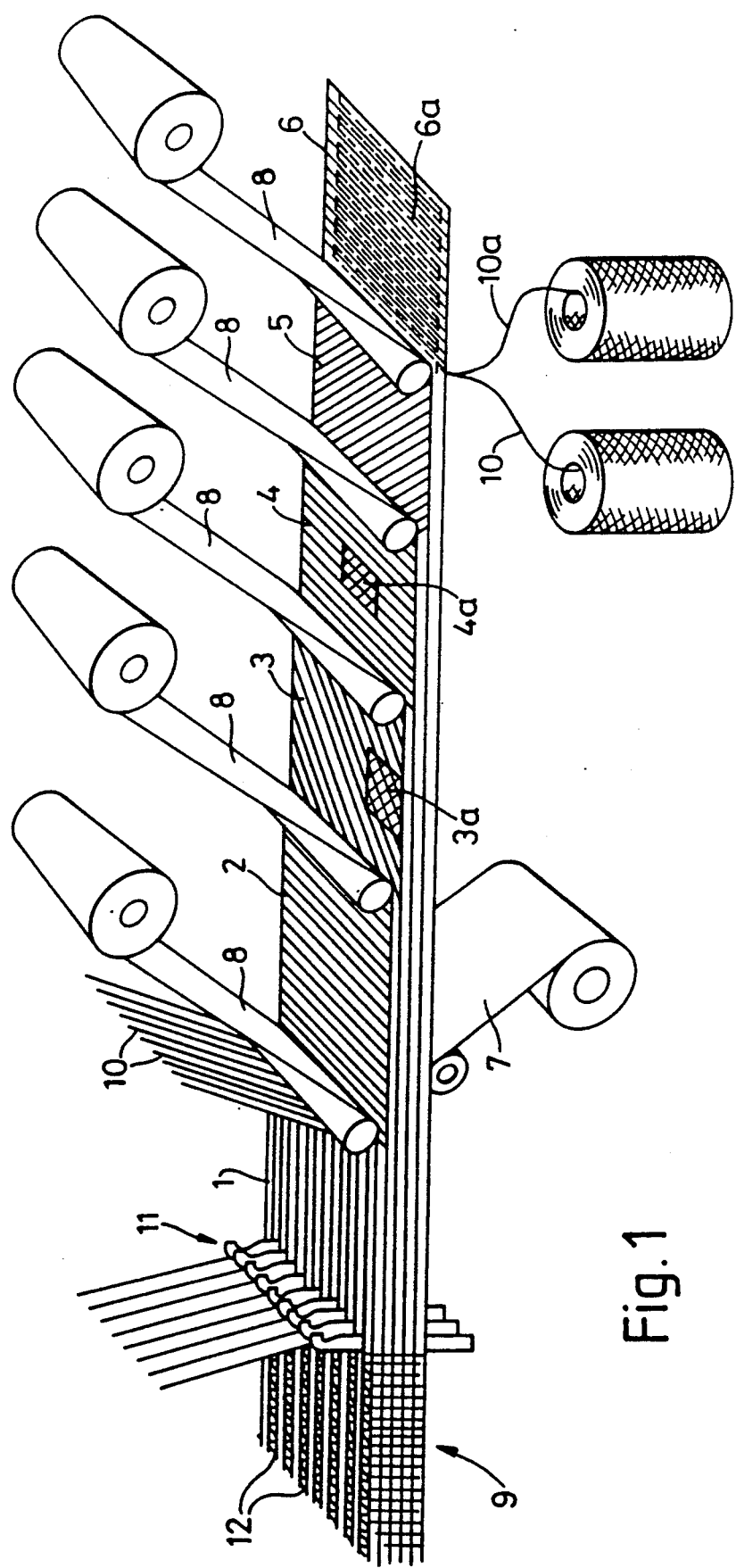
FIG. 1 is a diagrammatic perspective view illustrating the production of a reinforcing material for use in the process of the present invention.

Referring to FIG. 1 it will be seen that the reinforcing material comprises a plurality of layers designated 1-6 which are superimposed one upon the other, each layer consisting of a plurality of unidirectional, non-woven yarns or threads 10 laid side-by-side, the yarns or threads 10 in at least some of the different layers 1-6 extending in different directions as shown. Thus, as illustrated, the yarns or threads 10 in the layer extend longitudinally of the reinforcing material, the yarns or threads 10 in the layer 2 extend at right angles to the yarns or threads in the layer 1, the yarns or threads 10 in the layer 3 extend at between plus 45° up to 90° with respect to the yarns or threads in the layer I, and so on as indicated in the drawing. It will be understood that the number of layers in the reinforcing material and the orientation of the yarns or threads 10 in the individual layers may be varied as required to provide a multi-axial reinforcing material of required thickness and strength characteristics. The superimposed layers of reinforcing material are then stitched together by knitting therethrough as illustrated at 11 to provide stitching 12 which not only serves to hold the individual layers together but also to hold the yarns or threads 10 in each of the layers in fixed side-by-side relation to one another. If desired at least one film, sheet, ribbon or tape of thermoplastic synthetic resin material may be applied to one or both outer surfaces of the reinforcing material as indicated at 7 or interposed between some or all of the adjacent layers 1-6 as illustrated at 8 prior to stitching together the layers 1-6.

Yarns or threads 10a of thermoplastic material can be interspersed or co-mingled with the yarns or threads 10 in one or more of the layers 1-6 as illustrated at 6a, either to provide additional matrix material or to replace the thermoplastic sheet of film material 7 and/or 8.

Also if desired, pieces or patches 3a, 4a of reinforcing material can be inserted between any of the adjacent layers 1-6 prior to said stitching, as by means of a suitable robot mechanism, to provide additional reinforcement or thickness of a required size and shape and at required locations in the finished articles.

Figure 2:
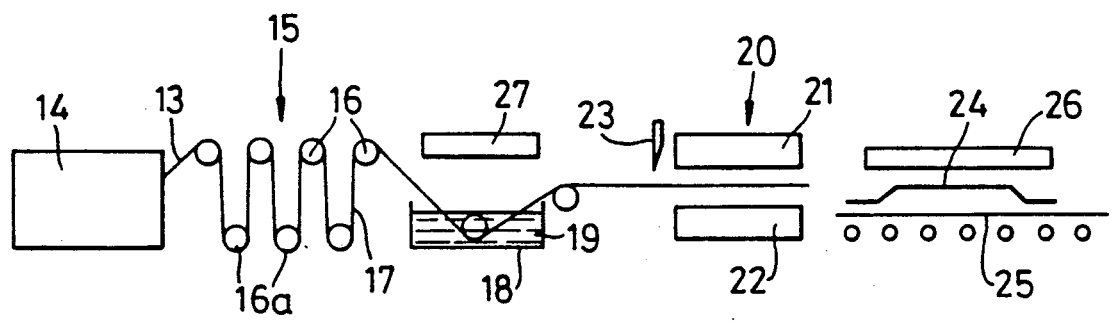
FIG. 2 is a flow diagram illustrating a process according to one embodiment of the present invention.

In the process illustrated in FIG. 2, reinforcing material 13 from the reinforcing material producing means 14 is accumulated in an accumulator 15 comprising a plurality of rollers 16 and deadweight rollers 16a over which the reinforcing material 13 is draped so that it hangs down in folds 17. The reinforcing material 13 then passes from the accumulator 15 through a bath 18 where it is wetted with synthetic resin material 19 before passing to a closed mould 20 having closable mould parts 21, 22. A cutting blade 23 or other suitable separating means is provided for separating the portion of the reinforcing material 13 which is to be or which is being moulded from the remainder of the reinforcing material. The wetted reinforcing material is preferably formed in the mould under heat and pressure. The moulded article 24 produced in the mould may be cured or consolidated in the mould or after removal from the mould as by being carried on a conveyor 25 past curing or consolidating means 26 which in the case of a thermoplastic resin material may be suitable cooling means and in the case of a thermosetting resin material may be suitable heating means, ultra-violet light emitting means or the like.

It will be understood that if the reinforcing material 13 comprises films or sheets of thermoplastic material 7, 8 and/or yarns or threads 10a of thermoplastic material as illustrated in FIG. 1, the bath 18 would be omitted and would be replaced by suitable heating means 27 for softening the thermoplastic material and so wetting the reinforcing material.

Figure 3:
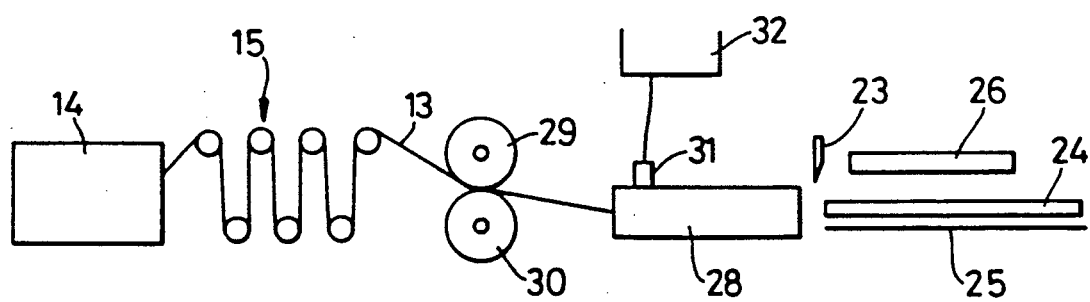
FIG. 3 is a flow diagram illustrating a process according to another embodiment of the present invention.

In the process illustrated in FIG. 3, in which like parts have been indicated by like reference numerals, the wetted reinforcing material is formed in a pultrusion die 28. The reinforcing material 13 may be wetted with synthetic resin material either by heating reinforcing material comprising layers 7, 8 and/or yarns or threads 10a of thermoplastic material such as by passing it between heated calendar rollers 29, 30 or by injecting synthetic resin material into the reinforcing material 13 within the pultrusion die 28 using suitable injecting means 31 which inject synthetic resin material from a supply 32 thereof. Separating means such as the cutting blade 23 is provided downstream of the pultrusion die 28. The formed articles 24 may be cured or consolidated by suitable curing means 26 as previously described.

Figure 4:
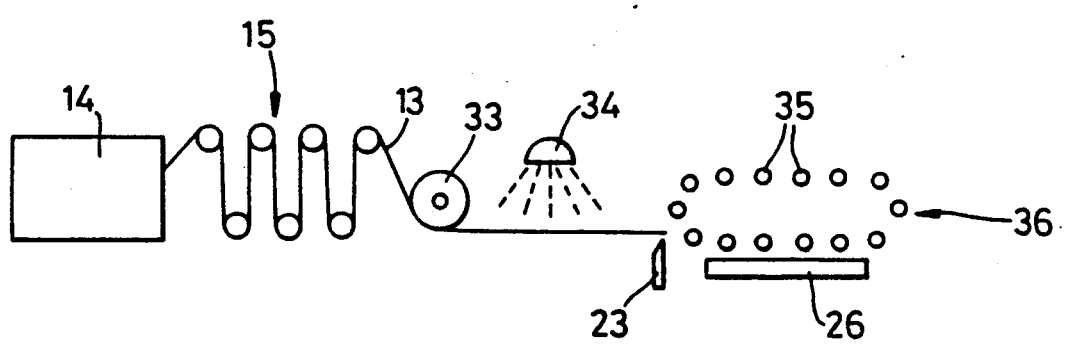
FIG. 4 is a flow diagram illustrating a process according to a further embodiment of the present invention.

In the process illustrated in FIG. 4, in which again like parts have been indicated by like reference numerals, the reinforcing material from the accumulator 15 passes by way of a guide roller 33 to wetting means which in this case is illustrated as comprising spray means 34. The wetted reinforcing material 13 is wrapped a required number of times around one of a plurality of mandrels or formers 35 mounted on a conveyor, the mandrel or former 35 being rotated to effect the wrapping operation. The wrapped material is severed from the remainder of the reinforcing material 13 by the separating means 23 and the wrapped mandrel or former 35 then passes by way of the curing or consolidating means 26 to a removing station 36 where the formed article is removed from the mandrel or former 35. Where large articles are to be produced, e.g., large sewer pipes, the mandrels or formers 35 may be replaced by a single large mandrel or former mounted on suitable supports and provided with suitable drive means all in known manner.

It will be understood from the foregoing description that the process of the present invention enables a wide range of different reinforced articles, e.g., reinforced plastic articles, to be produced at high production rates and low cost from basic raw materials, i.e., directly from reinforcing yarns or threads and synthetic resin or other matrix materials.

I claim:

1. A process for forming a reinforced article, comprising the steps of:
   (a) continuously supplying yarns or threads to a first station,
   (b) continuously producing at said first station a reinforcing material having a plurality of superimposed layers, each layer consisting of a plurality of unidirectional non-woven yarns or threads laid side-by-side, the yarns or threads in at least two of the different layers extending in different directions,
   (c) stitching together said layers,
   (d) continuously passing the reinforcing material to a wetting station,
   (e) wetting said reinforcing material at said wetting station with a matrix material,
   (f) continuously passing the wetted reinforcing material to a forming station,
   (g) at said forming station forming the wetted reinforcing material to the shape of an article, and
   (h) curing or consolidating the matrix material to produce said article.

2. A process according to claim 1, wherein the yarns or threads supplied to said first station are drawn from a creel or beam and are laid side-by-side so that they extend in a selected direction.

3. A process according to claim 1, wherein the yarns or threads in at least first and second said layers extend at 90° to one another.

4. A process according to claim 3, wherein the yarns or threads in at least a third layer extend at an angle of from 45° to 90° with respect to the yarns or threads in at least one of said first and second layers.

5. A process according to claim 1, wherein said layers comprise at least a first layer in which the yarns or threads extend in a first direction, a second layer in which the yarns or threads extend in a second direction at 90° to the first direction, a third layer in which the yarns or threads extend in a third direction at 45° to the first direction, and a fourth layer in which the yarns or threads extend in a fourth direction at 45° to the first direction and at 90° to the third direction.

6. A process according to claim 1, wherein the yarns or threads are of glass fibres.

7. A process according to claim 1, wherein said yarns or threads are selected from the group consisting of glass fibre, carbon fibre, aramid fibre, ceramic fibre, metal, polyethylene fibre, polyester fibre and mixtures thereof.

8. A process according to claim 1, wherein said layers are stitched together by knitting therethrough.

9. A process according to claim 1, wherein the yarns or threads in each of said layers are held by said stitching in fixed side-by-side relation to one another.

10. A process according to claim 1, wherein at least one sheet or film of thermoplastic resin matrix material is interposed between two or more of said layers.

11. A process according to claim 1, wherein the reinforcing material is isotropic.

12. A process according to claim 1, wherein in at least one of said layers the yarns or threads are laid at different densities in different parts of the layer to provide different strength characteristics in different parts of the reinforcing material.

13. A process according to claim 1, wherein the wetted reinforcing material is formed in a mold.

14. A process according to claim 13, wherein the wetted reinforcing material is moulded in a closed mould.

15. A process according to claim 13, wherein the wetted reinforcing material is moulded using heat and pressure.

16. A process according to claim 1, wherein the wetted reinforcing material is formed by passing it through a die.

17. A process according to claim 16, wherein the die is a pultrusion die.

18. A process according to claim 16, wherein the steps of wetting the reinforcing material with said matrix material is performed as the reinforcing material passes through said die.

19. A process according to claim 1, wherein the matrix material is cured or consolidated as the formed article leaves said die.

20. A process according to claim 1, wherein the wetted reinforcing material is formed by wrapping it around a mandrel or former.

21. A process according to claim 20, wherein the mandrel or former is rotated to wrap the wetted reinforcing material therearound.

22. A process according to claim 20, wherein the mandrel or former is collapsed to facilitate the removal thereof from a formed article.

23. A process according to claim 1, wherein the matrix material is a thermoplastic material which is heated to wet the reinforcing material prior to the step of forming of the wetted reinforcing material.

24. A process according to claim 1, wherein the matrix material is a thermosetting resin which is cured during forming.

25. A process according to claim 24, wherein the thermosetting resin material is cured by applying heat thereto.

26. A process according to claim 1, wherein pieces or patches of reinforcing material are inserted at selected positions between said layers prior to said stitching.

27. A process according to claim 1, wherein at least one sheet or film of thermoplastic resin matrix material is applied to at least one of the major outer surfaces of the reinforcing material prior to the stitching together of said layers.

28. A process according to claim 1, wherein at least one sheet or film of thermoplastic resin matrix material is interposed between at least two of said layers and is applied to at least one of outer surfaces of the reinforcing material prior to the stitching together of said layers.

29. The process of claim 1, wherein the matrix material is a thermosetting resin which is cured after forming.

30. The process of claim 24, wherein the thermosetting resin material is cured by applying ultra-violet light thereto.

* * * * *

UNITED STATES PATENT AND TRADEMARK OFFICE
CERTIFICATE OF CORRECTION

PATENT NO. : 5,055,242

DATED : October 8, 1991

INVENTOR(S) : Jeffrey A. VANE

It is certified that error appears in the above-identified patent and that said Letters Patent is hereby corrected as shown below:

Claim 19, column 8, line 21, change "claim 1" to --claim 16--.

Signed and Sealed this

Nineteenth Day of January, 1993

Attest:

DOUGLAS B. COMER

*Attesting Officer*   Acting Commissioner of Patents and Trademarks